(12) United States Patent
Greenland

(10) Patent No.: US 6,276,990 B1
(45) Date of Patent: Aug. 21, 2001

(54) TILE SAW HAVING IMPROVED ROLLERS

(76) Inventor: Darrell Greenland, 934 4th St., #21, Santa Monica, CA (US) 90403

( * ) Notice: Subject to any disclaimer, the term of this patent is extended or adjusted under 35 U.S.C. 154(b) by 0 days.

(21) Appl. No.: 09/481,168

(22) Filed: Jan. 12, 2000

Related U.S. Application Data

(63) Continuation-in-part of application No. 08/906,356, filed on Aug. 5, 1997.

(51) Int. Cl.$^7$ .................................................... B24B 49/00
(52) U.S. Cl. ............................................ 451/11; 125/13.03
(58) Field of Search ....................... 451/11, 188, 111, 451/213, 359, 361; 125/13.01, 35

(56) References Cited

U.S. PATENT DOCUMENTS

| | | |
|---|---|---|
| 1,900,553 | 3/1933 | Hampton . |
| 2,903,026 | 9/1959 | Frydenlund . |
| 3,807,095 | 4/1974 | Harding . |
| 3,935,777 | 2/1976 | Bassett . |
| 4,280,472 * | 7/1981 | Cochran ............................ 125/13.03 |
| 4,428,159 * | 1/1984 | Sigetich ............................ 125/13.03 |
| 4,991,354 * | 2/1991 | Schweickhardt ....................... 125/35 |
| 5,010,978 | 4/1991 | Jimmerson . |
| 6,080,041 * | 6/2000 | Greenland ........................ 125/13.01 |

FOREIGN PATENT DOCUMENTS

| | | |
|---|---|---|
| 2681055 | 5/1992 | (FR) . |
| 61219543 | 9/1986 | (JP) . |
| 62246441 | 10/1987 | (JP) . |

\* cited by examiner

*Primary Examiner*—Joseph J. Hail, III
*Assistant Examiner*—Daniel Sharley
(74) *Attorney, Agent, or Firm*—Cislo & Thomas LLP

(57) ABSTRACT

A unique table saw having a roller mounted table operatively associated with a roller mounted carriage operatively secured to a supporting frame which allows the table and associated carriage to move outwardly from the supporting frame to allow the cutting of larger workpieces than could ordinarily be accomplished on the ordinary, conventional table saw.

12 Claims, 3 Drawing Sheets

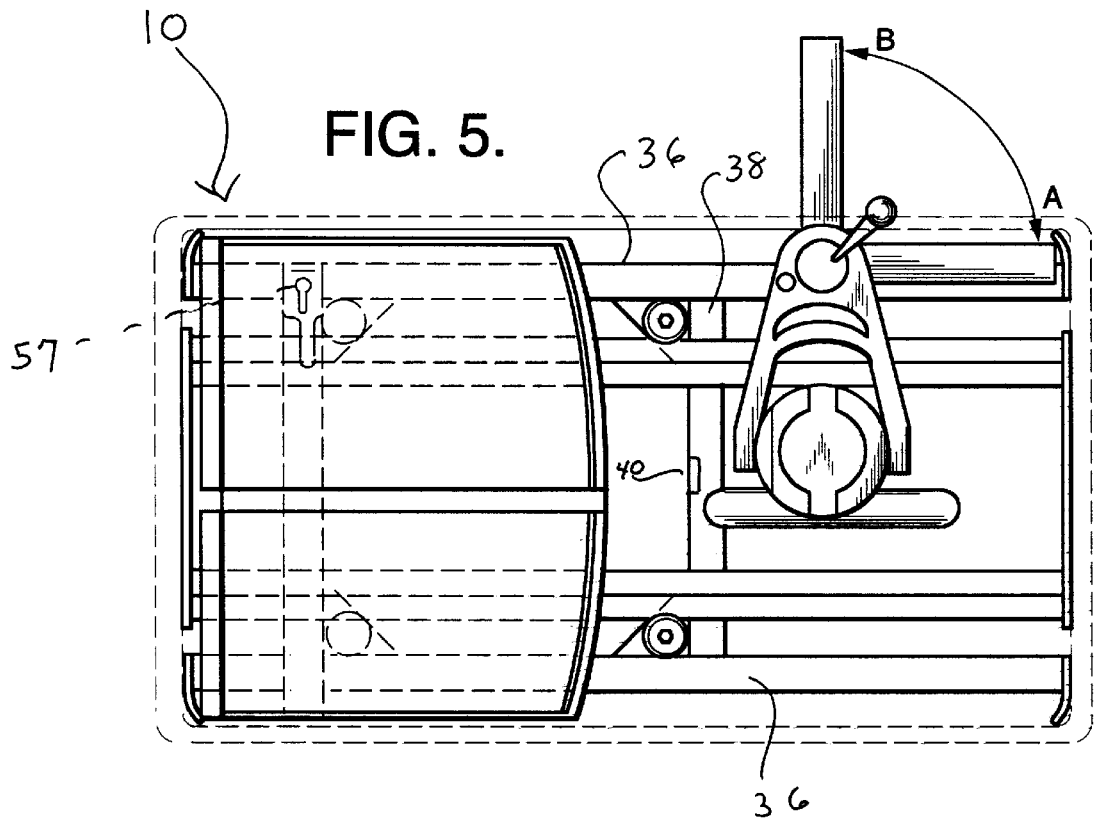

TILE SAW HAVING IMPROVED ROLLERS

CROSS-REFERENCES TO RELATED APPLICATIONS

This application is a continuation-in-part application of application Ser. No. 08/906,356 filed Aug. 5, 1997, and entitled COMPACT MOTORIZED TABLE SAW.

BACKGROUND OF THE INVENTION

This invention as its parent relates generally to motorized table saws and, more particularly, to portable motorized table saws for the cutting of small workpieces, such as ceramic tile and the like.

As previously described in my earlier application, electrically powered table saws for the cutting of small workpieces, such as tile and the like have been well known for years. It is generally desirable for tile saws to be portable so that they can be used in close proximity to the tile job, which could be in a small bathroom or kitchen. Larger tile saws that are not readily portable must be left in the back of a work truck, thereby forcing a tile worker to waste time making numerous trips between the work area and the truck to cut tiles.

One such table saw includes a motor mounted to a support arm extending upward from the edge of a structural frame with a sliding table mounted thereon. A circular blade is mounted to the motor in a position to cut workpieces on the sliding table. The reciprocating table does not extend beyond the edges of the frame. Because the cutting of ceramic tile involves the use of water as a lubricant for the saw blade, the frame of the table saw is mounted on the upper edges of a rectangular tub functioning as a catch basin for water used in the cutting process. The motor of the saw is electrically powered ad has a motor switch mounted thereon that is manually activated each time a tile is to be cut.

As stated in my earlier application, while this table saw has proven to be generally satisfactory, it has a number of drawbacks that render it inconvenient to use and limit its ability to cut different size tile in confined spaces, such as a small bathroom or the like. Significantly, the distance between the saw blade and motor support arm limits the size of the workpiece that can be cut by the saw. Further, because the reciprocating table is limited in its travel to the ends of the frame, the saw is further limited in its ability to cut long tiles. Yet another drawback is related to the manual switch that activates the motor. Because this switch must be activated by the operator again and again as each of the numerous tiles are cut, a particular job will take longer due to the cumulative time spent in activating and deactivating the switch for each tile cut.

It should, therefore, be appreciated that there is a need for a portable and compact saw that has easily moveable operating components and which permits the cutting of large workpieces. The present invention fulfills this need.

SUMMARY OF THE INVENTION

The present invention provides a portable and compact saw that permits the cutting of large workpieces and that can be repeatedly operated by reason of the roller system utilized without becoming clogged or difficult to use. A pivoting or stationary support arm allows the cutting of large workpieces, while allowing the size of the saw to remain relatively compact.

In particular, and for purposes of example only, the invention provides a compact saw for cutting a workpiece. The saw includes a frame, a carriage, a table, a support arm and a motor assembly. The frame has at least one side edge and at least one end edge and the table is mounted to the carriage, in roller fashion, to support the workpiece thereon. The carriage in turn is roller mounted on the frame for linear movement. The table has an upper surface aligned in a predetermined plane. The support arm is mounted adjacent to the side edge of the frame and projects upwardly from the frame and may be stationary or pivotable for compactness. The motor assembly is mounted to the support arm and includes a motor and a saw blade connected to the motor to cut the workpiece. As indicated, the support arm may be pivotally mounted to the frame for rotation about a first axis generally perpendicular to the plane that is aligned with the upper surface of the table.

In a more detailed aspect of the invention, as disclosed in my earlier application, the support arm pivots about the axis between a stowed position and an extended position. In the stowed position, the support arm is aligned with the side edge of the frame and, in the extended position, the arm projects away from the side edge of the frame to increase the distance between the support arm and the blade to advantageously allow cutting of larger workpieces. However, where the support arm is fixed, advantages of the disclosed invention are readily apparent.

More detailed aspects of the invention provide for the motor assembly to be pivotally mounted to the support arm for rotation about a second predetermined axis. This second axis can be aligned with the first predetermined axis about which the support arm pivots to enable the movement of the support arm between the extended and stowed positions without requiring the movement of the motor assembly.

Though not disclosed herein, this embodiment of the invention may provide for the compact saw that includes a sensor and a power switch mounted to a motor assembly. As disclosed in my earlier application the power switch is connected to a power source and the motor, thereby allowing the sensor to activate the power switch to energize the motor assembly. In this embodiment, the sensor is an arm pivotally mounted to the power switch. The arm projects from the switch toward a predetermined location above the saw table so that movement of the workpiece toward the saw blade causes the workpiece to engage the arm, thereby rotating it and activating the power switch. This automatic activation of the saw advantageously allows an operator to quickly activate the saw for repeated cutting operations. All of this is adequately disclosed in my earlier application and may be included in the invention disclosed herein. The sliding carriage assembly is roller mounted between the frame and the table for linear movement parallel to an edge of the frame so that the table translates to a position beyond the end of the frame for cutting of a larger workpiece. This sliding table contributes to the compact size of the saw by advantageously traveling beyond the frame to hold and cut large workpieces when desired. The roller mounted table secured to the carriage is linearly moveable with respect thereto. Having roller mounting as opposed to slide mounting facilitates use of the saw and also makes the saw easier to use where tile cutting debris is expected to accumulate on working parts.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings:

FIG. 5 is a top view of the compact tile saw of FIG. 1.

DESCRIPTION OF THE PREFERRED EMBODIMENT(S)

Figure 1:
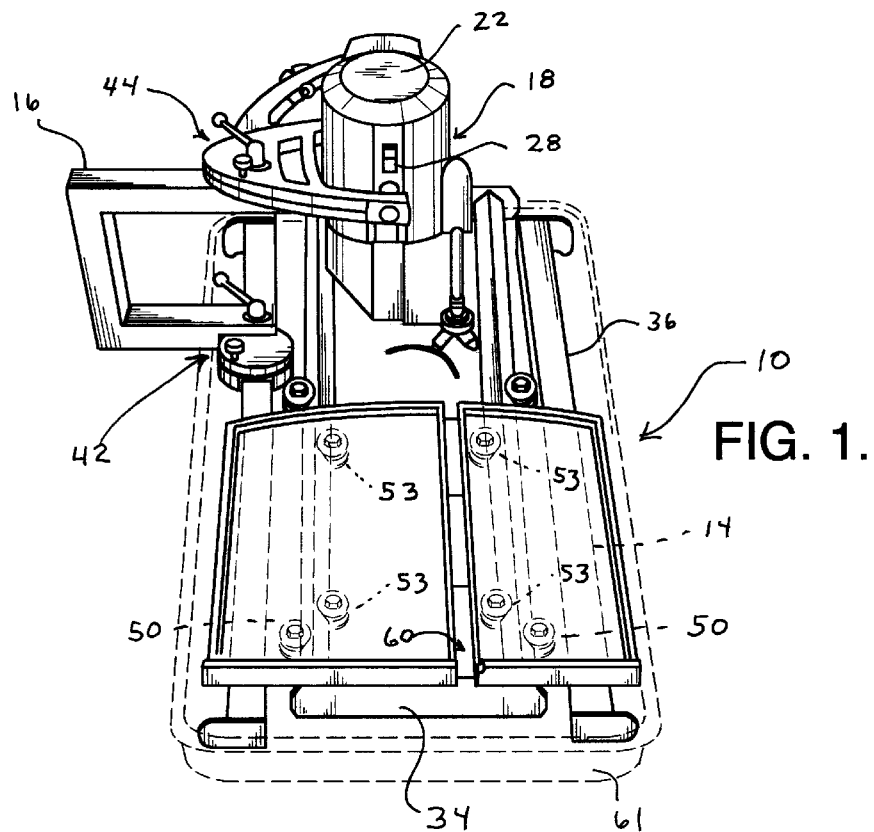
FIG. 1 is a perspective top view of a compact tile was according to the invention.
Figure 2:
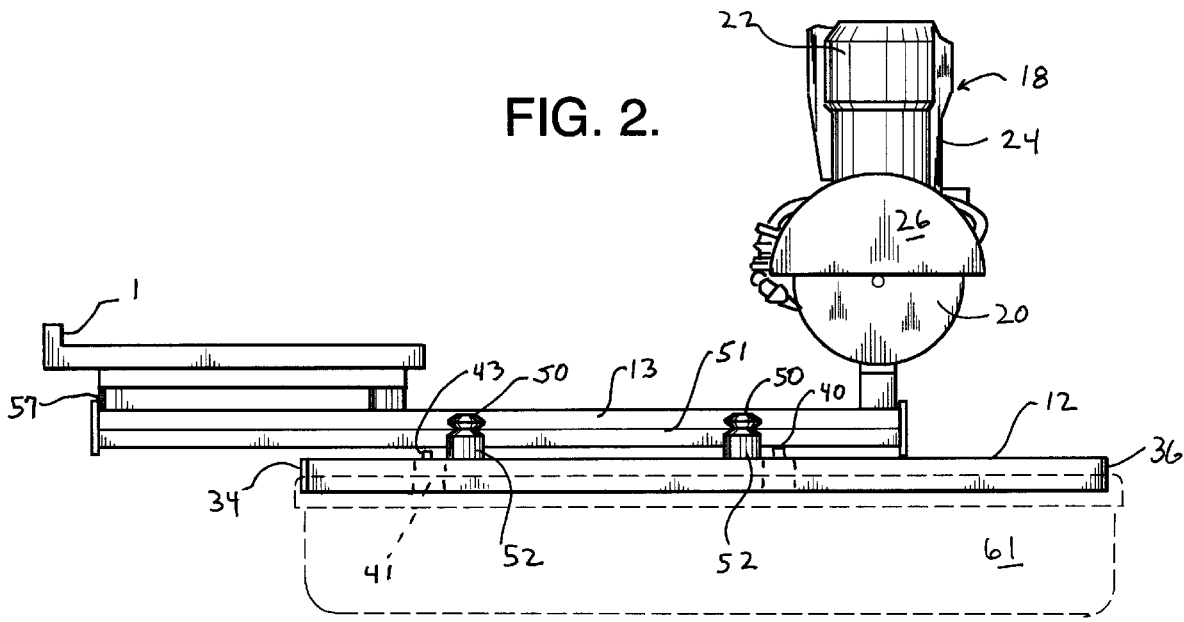
FIG. 2 is a side elevational view of the compact tile saw of FIG. 1.
Figure 3:
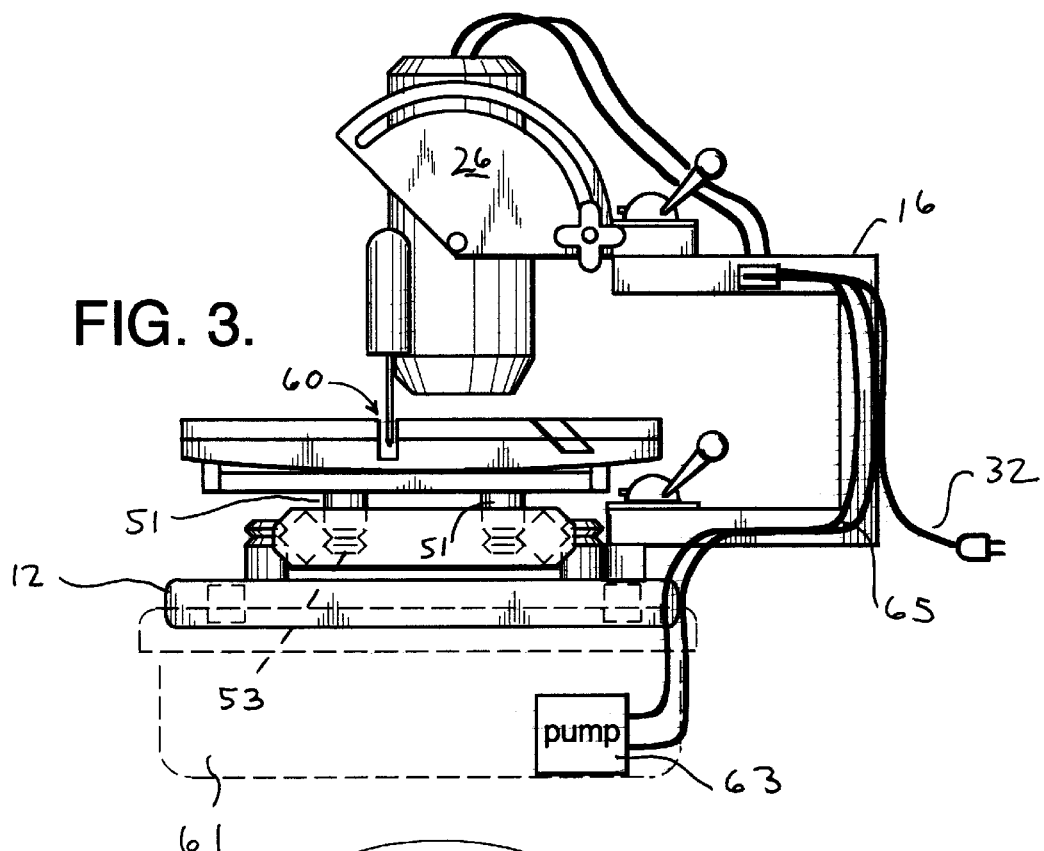
FIG. 3 is a front view of the compact tile saw of FIG. 1.
Figure 4:
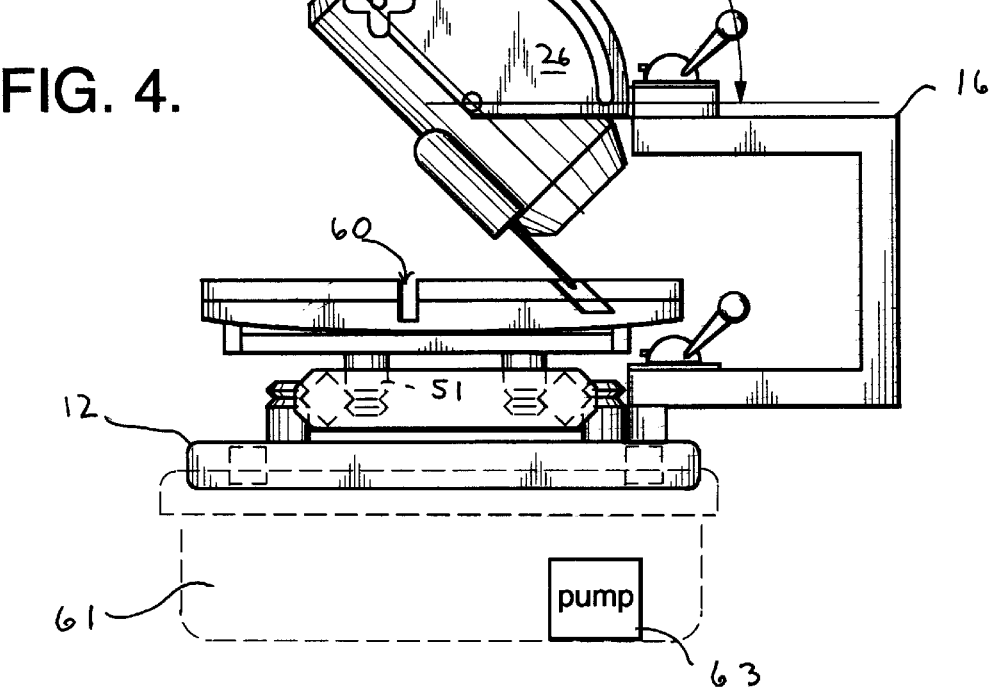
FIG. 4 is a view similar to FIG. 3 showing how the saw on cutting means may be pivotally mounted.

With reference now to the drawings, the invention is preferably embodied by a new and improved compact saw, generally referred to by reference numeral 10, for the cutting of workpieces such as tile and the like. The compact tile saw has a rectangular frame 12 upon which are mounted a roller mounted carriage 13 upon which is roller mounted sliding table 14. A pivoting support arm 16 holding a motor assembly 18 above the table 14.

The motor assembly 18 includes a cutting blade 20 mounted to an electric motor 22 within a housing 24. A saw blade guard 26 is located around the upper portion of the saw blade 20. Both the guard 26 and the housing 24 of the motor assembly can be made of plastic or other suitable material. The motor assembly may include a special lever (not shown) mounted to a power switch to automatically turn on the motor as a tile is moved toward the motor assembly 18, as is disclosed in the parent application. A power cord 32 extends from the motor assembly to provide electric power to the motor. A manual switch 28 is also provided on the motor housing 24 by which to turn the power on and off.

As is described in more detail below with respect to the pivotable support arm embodiment, the pivoting support arm has a "U" shape and is movable between a stowed position A and an extended position B (FIG. 5). Because of this special pivoting arm, the collective size of the saw 10 is such that it can be used in confined spaces, such as small bathrooms and the like. While facilitating the compact size of the saw, the special pivoting arm advantageously pivots to its extended position to enable the saw to cut larger size tile. Another component of the saw 10 that contributes to its compact size is the special roller mounted table 14, which can advantageously travel beyond the frame 12 to enable the saw to cut larger workpieces. It is obvious that the support arm 16 may be fixed as opposed to pivotable and still obtain certain attributes of the invention.

The frame 12 and the other components of the saw are preferably formed of a rigid high strength material, such as steel or other materials of similar characteristics. Extrusions are commonly used as rail members, frame and other components. The frame has two end edges 34 and two longer side edges 36. Lateral brace 38 extends between the side edges 36 of the frame 12 to provide rigidity to the frame and to limit the travel distance of carriage 13 by means of upstanding tab 40, towards saw 20. Oppositely, to limit travel of carriage 13 away from saw 20 and to provide additional rigidity, lateral brace 41 with upstanding limit tab 43 is provided. As is shown, to facilitate pivotal or arc-wise movement of the support arm 16 and the motor assembly 18, the arm 16 is pivotally supported from frame 16 through pivot 42 at its lower end and through pivot 44 at its open end. Thus, the arm 16 may pivot or move along an arc AB is seen in FIG. 5 and the motor 18 may pivot in a plane parallel to table 14. The motor 22 preferably is a commonly available electrically powered motor. The frame 12 and more specifically the lateral, elongate side edges 36 are provided with integral track means 51 running the length of frame 12. Track means 51 is shown in the form of a rectangular bar presenting V-shaped side walls.

Fixed to the support frame 12 are spaced and opposed rollers 50 having grooves 52 to be received by track means 51. Each of the rollers 50 are mounted on upstanding posts 52 which are integrally formed, in this instance with frame 12. Each roller 50 is mounted via through bolts for free roller movement thereabout such that carriage 13 smoothly travels in linear fashion between the stopping tabs 40 and 43. In similar fashion, table 14 has four integrally formed, spaced and opposed roller mounting block portions 51 each rotatingly supporting rollers 53 such that table 14 is roller, slidably mounted on the opposite side of the track means 51 that carriage 13 rides upon. The exterior surfaces 55 and 57 of mounting block portions 51 provide abutment stops for table 14, limiting the linear movement thereof with respect to carriage 13 by reason of engagement therewith.

As shown, the frame 12 is preferably made of angle iron. The track means and the rollers allow lateral or linear movement of the table and carriage along their lengths. The table 14 has an upper surface 56, or top side, with an intermediate space 60 extending the length of the table. The intermediate space 60 of the table provides clearance for the blade 20 of the saw 10 as it cuts the tile. As is well known, the frame 12 can be mounted on a catch basin 61 to catch water used to lubricate the cutting process. Here the catch basin 61 takes the form of a plastic tub within which water is contained. The pump 63 pumps water (not shown) via hose 65 to saw 20.

The above arrangement advantageously allows the compact tile saw 10 to have a compact size because of its ability to cut small tiles which can be cut while the support arm 16 is in the stowed position A. Further, despite its compact size, the tile saw can cut larger tiles with its rotating support arm in its extended position B. In particular, the saw can cut such larger tiles because the distance between the saw blade 20 and the vertical portion of the support arm 16 is greater when the support arm is pivoted to its extended position B.

Further, as previously indicated, the table of the compact tile saw 10 has a pair of rollers that roll on carriage 13 itself roller mounted to frame 12. The table may have an end edge 1 that extends upwardly. The rollers 53 are mounted between each end edge of the table and are in a position that is parallel to the side edges of the frame 12 and allows for roller movement along the track means 51. The carriage 13 rolls on the track means 51 supported off of rollers 50 supported off frame 12. In particular, as the table is moved laterally, the carriage 13 slides to the end of the frame 12. However, because of the roller mounting the table is advantageously not limited by the distance in which the carriage can move on the frame. Instead, when the carriage 13 reaches the end of the frame, the table can slide yet further. Such an arrangement can allow yet larger tiles to be cut without increasing the size of the frame of the compact tile saw 10. The table can be locked to the center of the carriage by a lock button 57 for the cutting of small tiles. When the lock button is released, the above-identified further movement of the table is accomplished.

While a particular form of the invention has been illustrated and described, it will be apparent that various modifications can be made without departing from the spirit and scope of the invention. Accordingly, it is not intended that the invention be limited, except as by the appended claims.

For example, while specifically shaped rollers and rails have been disclosed, it is obvious that other configured rollers, wheels, etc., as well as rails associated therewith may be utilized. Thus, half-round grooves or ball bearing races may be used. Further, the rollers may be eccentrically mounted.

Additionally, the major support components such as frame, rails and carriage assembly may be fabricated of metal extrusions. In some instances light strength molded plastics will suffice.

While the rollers that support the carriage have been shown in one orientation, it is clear that the rollers that support the carriage may be mounted on the carriage as opposed to being mounted on the frame. In so doing the frame in effect becomes the rail member for the carriage to ride upon.

Finally, while the saw blade is shown as being mounted above the table, it may be mounted below the table and still utilize the unique combination of table and carriage cooperative assembly and action to obtain significant attributes of the invention.

What is claimed is:

1. A compact saw for cutting a workpiece, the compact saw comprising:
   a frame having at least one side edge and at least one end edge; a roller mounted carriage assembly mounted for linear movement on said frame, a table roller mounted to said carriage assembly to support the workpiece thereon, the table having an upper surface aligned in a predetermined plane;
   a support arm mounted adjacent to the side edge of the frame and projecting upwardly from the frame; and
   a motor assembly mounted to the support arm, the motor assembly including a motor and a saw blade for cutting the workpiece.

2. The compact saw in accordance with claim 1 wherein spaced rollers are mounted on said frame and the side edges of said carriage assembly define a track means along which said carriage moves in linear fashion.

3. The compact saw in accordance with claim 2 wherein said table has spaced rollers and is mounted for linear movement along said track means whereby said table may move linearly beyond the edges of said frame.

4. The compact saw is accordance with claim 3 wherein said rollers are mounted to spaced and opposed downwardly projecting portions of the undersurface of said table.

5. The compact saw in accordance with claim 4 wherein said spaced and opposed downwardly projecting portions co-act with the ends of said carriage assembly to limit the linear movement of said table with respect to said carriage assembly.

6. The compact saw in accordance with claim 5 wherein upwardly projecting frame portions support said spaced rollers mounted on said frame.

7. The compact saw in accordance with claim 6 wherein said upwardly projecting frame portions supporting said spaced rollers mounted on said frame form an abutment stop to limit the linear movement of said carriage assembly.

8. A compact saw for cutting a workpiece, comprising:
   a frame having at least one side edge and at least one end edge;
   a table roller mounted to the frame to support the workpiece thereon, the table having an upper surface aligned in a predetermined plane;
   a support arm mounted adjacent to the side edge of the frame and projecting upwardly from the frame;
   a motor assembly mounted to the support arm, the motor assembly including a motor and a saw blade connected to the motor to cut the workpiece; and
   a roller supported carriage assembly mounted between the frame and the table for rolling movement parallel to the edge of the frame for cutting of the workpiece such that the table is moveable to a predetermined position beyond the end of the frame, wherein the carriage assembly comprises:
   at least one guide rail mounted to the frame in a position parallel to the edge of the frame; and
   at least one extension rail roller mounted to the guide rail and roller mounted to the table of the saw.

9. A saw support for cutting a workpiece; comprising:
   a frame having at least one side edge and at least one end edge;
   a table mounted to the frame to support the workpiece thereon, the table having an upper surface aligned in a predetermined plane;
   a motor assembly operatively supported by said frame including a motor and a saw blade connected to the motor to cut the workpiece; and
   a free roller supported carriage assembly mounted directly on said frame and supporting said table for rolling movement parallel to the edge of the frame for cutting of the workpiece such that said table is moveable to a predetermined position beyond the end of the frame, said frame being open and formed by spaced, rigid members.

10. The saw support in accordance with claim 9 wherein one of said carriage assembly and said frame defines a track member.

11. A saw support for cutting a workpiece, comprising:
    a frame having at least one side edge and at least one end edge;
    a supported table roller mounted to a free rolling supported carriage assembly mounted on said frame, said table being adapted to support the workpiece thereon, the table having an upper surface aligned in a predetermined plane;
    a motor assembly operatively supported by said frame including a motor and a saw blade connected to the motor to cut the workpiece; and
    said free rolling carriage assembly being mounted for rolling movement parallel to the edge of the frame for cutting of the workpiece such that said table and free rolling carriage are moveable to a predetermined position beyond at lease one end of said frame.

12. A saw support for cutting a workpiece, comprising:
    a frame having at least one side edge and at least one end edge;
    a table mounted to the frame to support the workpiece thereon, the table having an upper surface aligned in a predetermined plane;
    a motor assembly operatively supported by said frame including a motor and a saw blade connected to the motor to cut the workpiece;
    a free rolling carriage assembly mounted between said frame and said table for rolling movement parallel to the edge of the frame for cutting the workpiece such that said table is moveable to a predetermined position beyond the end of the frame, said carriage assembly having at least one guide rail mounted to the frame in a position parallel to the edge of the frame and at least one extension rail rollerably mounted to the guide rail and roller mounted to said table.

* * * * *